Patented July 27, 1926.

1,593,982

UNITED STATES PATENT OFFICE.

CHARLES HENRI MARSCHALK, OF PARIS, FRANCE.

PROCESS FOR THE MANUFACTURE OF PERYLENE.

No Drawing. Application filed December 13, 1923, Serial No. 680,361, and in France December 21, 1922.

According to this invention perylene is made by the reaction of a metallic salt and a reducing agent upon a dihydroxylated compound of alpha-dinaphthyl or a suitable derivative thereof. The reaction may take place in the presence of water.

If an intimate mixture of a dihydroxylated compound of alpha-dinaphthyl (beta-dinaphthol for example) or a suitable derivative thereof (especially phosphoric esters) with a metallic salt (such as zinc chloride, moist ferric chloride, ferrous chloride and the like) and a reducing agent (such as zinc dust, reduced iron and the like) be heated with or without the addition of water, hydrocarbons very rich in perylene distill over.

The reaction may take place in vacuo, or a current of an inert or a reducing gas, such as hydrogen, may be led into the reacting mixture, and also a current of more or less superheated steam.

Pure perylene may be obtained by fractional distillation or by fractional crystallization from its suitable solution.

The reaction is unexpected, as there is no example in literature of effecting amalgamation between nuclei (such as takes place in this reaction) with agents such as zinc chloride, ferrous chloride or the like.

Beta-dinaphthol heated with zinc dust produces dinaphthylene oxide but the presence of zinc chloride or the like leads to a substantial formation of perylene. When beta-dinaphthol is treated with zinc chloride alone, no perylene is produced.

The invention is illustrated in the accompanying examples, but the proportions of the ingredients may vary within fairly wide limits.

*Example I.*—An intimate mixture of one part of beta-dinaphthol, one and two third parts of zinc dust, one and one half parts of molten zinc chloride and one half part of water are heated in a retort to distillation. Orange vapours are evolved which at once form a crystalline mass. The product is then treated with dilute caustic soda to remove traces of beta-naphthol. When crystallized out of three parts of toluene, the first crop of crystals obtained is bronze colour and melts at 240° C. By washing with ether or by crystallizing a second time out of toluene, a product which melts at 265° C. is obtained, and this is the theoretical melting point of perylene.

*Example II.*—Two molecules of phosphorus oxychloride are caused to react upon one molecule of beta-dinaphthol; the ester so obtained is mixed with zinc chloride and zinc dust, whereupon distillation is effected as before.

In the claims the term "metallic chloride condensing agent" is used to denote zinc chloride, moist ferric chloride, ferrous chloride or their equivalents.

What I claim is:—

1. The manufacture of perylene by heating to distillation, a mixture of a beta-dinaphthol, a metallic chloride condensing agent, and a finely divided metallic reducing agent.

2. In the process as set forth in claim 1, the method of executing the same in the presence of hydrogen.

3. The manufacture of perylene by heating to distillation a mixture of a dihydroxylated compound containing the dinaphthyl radical, a metallic chloride condensing agent, and a finely divided metallic reducing agent.

4. In the process as set forth in claim 3, the method of executing the same in the presence of a non-oxidizing fluid.

In testimony whereof I affix my signature.

CHARLES HENRI MARSCHALK.